United States Patent
Nakatani

(10) Patent No.: US 12,306,196 B2
(45) Date of Patent: May 20, 2025

(54) ANALYSIS DEVICE MANAGEMENT SYSTEM AND NON-TRANSITORY COMPUTER READABLE MEDIUM STORING PROGRAM

(71) Applicant: SHIMADZU CORPORATION, Kyoto (JP)

(72) Inventor: Takayuki Nakatani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 775 days.

(21) Appl. No.: 17/665,784

(22) Filed: Feb. 7, 2022

(65) Prior Publication Data
US 2022/0260600 A1 Aug. 18, 2022

(30) Foreign Application Priority Data
Feb. 18, 2021 (JP) ................. 2021-024706

(51) Int. Cl.
*G01N 35/00* (2006.01)
*G01N 30/88* (2006.01)

(52) U.S. Cl.
CPC ....... *G01N 35/00663* (2013.01); *G01N 30/88* (2013.01); *G01N 35/00871* (2013.01); *G01N 2035/00633* (2013.01); *G01N 2035/00653* (2013.01)

(58) Field of Classification Search
CPC . G01N 2030/8804; G01N 2035/00633; G01N 2035/00653; G01N 2035/00881; G01N 30/88; G01N 35/00663; G01N 35/00712; G01N 35/00871
See application file for complete search history.

(56) References Cited

U.S. PATENT DOCUMENTS

| 2015/0100686 A1* | 4/2015 | Sakurai ................. G06F 3/1203 709/224 |
| 2015/0106060 A1* | 4/2015 | Hirahara ................. G06Q 10/20 702/188 |

FOREIGN PATENT DOCUMENTS

| JP | 2005249724 A | * | 9/2005 |
| JP | 2005-283526 A | | 10/2005 |
| JP | 2013-148992 A | | 8/2013 |
| JP | 2003-344422 A | | 12/2023 |

OTHER PUBLICATIONS

JP 2005-249724 A Preview English translation (Year: 2024).*
(Continued)

*Primary Examiner* — Jennifer Wecker
*Assistant Examiner* — Jonathan Bortoli
(74) *Attorney, Agent, or Firm* — Renner, Otto, Boisselle & Sklar, LLP

(57) ABSTRACT

An analysis device management system manages one or a plurality of analysis devices and includes a first generator that one-to-one corresponds to each analysis device and manages state information of a corresponding analysis device, a storage that stores the module, a receiver that receives an analysis execution request for using the one or plurality of analysis devices, and a state manager that updates the state information of one or a plurality of modules corresponding to the one or plurality of analysis devices designated by the received analysis execution request.

8 Claims, 5 Drawing Sheets

(56) References Cited

OTHER PUBLICATIONS

Notice of Reasons for Refusal in corresponding Japanese Patent Application No. 2021-024706 dated Mar. 19, 2024, with English machine translation.
Office Action in corresponding Chinese Patent Application No. 202210077106.6 dated Jan. 23, 2025, with machine translation.

\* cited by examiner

ANALYSIS DEVICE MANAGEMENT SYSTEM AND NON-TRANSITORY COMPUTER READABLE MEDIUM STORING PROGRAM

BACKGROUND

Technical Field

The present invention relates to an analysis device management system and a non-transitory computer readable medium storing a program for executing the management system.

Description of Related Art

There is a management system that manages an analysis device such as a liquid chromatograph or a mass spectrometer. The management system manages a model name of an analysis device, information such as a serial number, state information of an analysis device and usage information of consumables included in an analysis device. A user can search for an analysis device that can execute a desired analysis process or obtain statistical information such as usage rate of an analysis device by utilizing the management system.

Methods of managing an analysis device by the management system include a method of managing a single analysis device and a method of managing a plurality of analysis devices as one virtual device. With the former management method, when an analysis process requiring a plurality of analysis devices is executed, a user needs to consider a method of connecting analysis devices to one another, a method of causing the analysis devices to cooperate with one another, etc. based on individually managed information of the analysis devices and determine whether the analysis process is executable. With the latter management method, when an analysis process requiring a plurality of analysis devices is executed, the user can integrally operate the plurality of analysis devices by referring to the information of a virtual device. JP 2013-148992 A, described below, relates to a network-type analysis device system utilizing a data management server that manages a file related to a plurality of analysis devices.

SUMMARY

As described above, the method of managing a combination of the plurality of analysis devices is beneficial in finding a device that can execute an analysis process requiring a plurality of analysis devices. On the other hand, the problem is that it is difficult to identify the states of individual analysis devices with this management method. For example, in a case where two different virtual devices share one analysis device, the problem is that the state of the shared analysis device, the usage conditions of consumables, etc. cannot be identified accurately.

An object of the present invention is to provide a system that can identify states of individual analysis devices while being capable of searching for a device that can execute an analysis process requiring a plurality of analysis devices.

An analysis device management system according to one aspect of the present invention that manages one or a plurality of analysis devices, includes a first generator that generates a module that one-to-one corresponds to each analysis device and manages state information of a corresponding analysis device, a storage that stores the module, a receiver that receives an analysis execution request for using the one or plurality of analysis devices, and a state manager that updates the state information of one or a plurality of modules corresponding to the one or plurality of analysis devices designated by the received analysis execution request.

The analysis device management system may include a second generator that generates a virtual device constituted by one or a plurality of modules.

A non-transitory computer readable medium storing an analysis device management program according to another aspect of the present invention that manages one or a plurality of analysis devices causes a computer to execute the processes of generating a module that one-to-one corresponds to each analysis device and manages state information of a corresponding analysis device, receiving an analysis execution request for using the one or plurality of analysis devices, and updating the state information of one or a plurality of modules corresponding to the one or plurality of analysis devices designated by the received analysis execution request.

A non-transitory computer readable medium storing the analysis device management program may cause a computer to further execute a process of generating a virtual device constituted by one or a plurality of modules.

Other features, elements, characteristics, and advantages of the present disclosure will become more apparent from the following description of preferred embodiments of the present disclosure with reference to the attached drawings.

DETAILED DESCRIPTION

An analysis device management system and a program according to embodiments of the present invention will now be described with reference to the attached drawings.

(1) Overall Configuration of Analysis System

Figure 1:
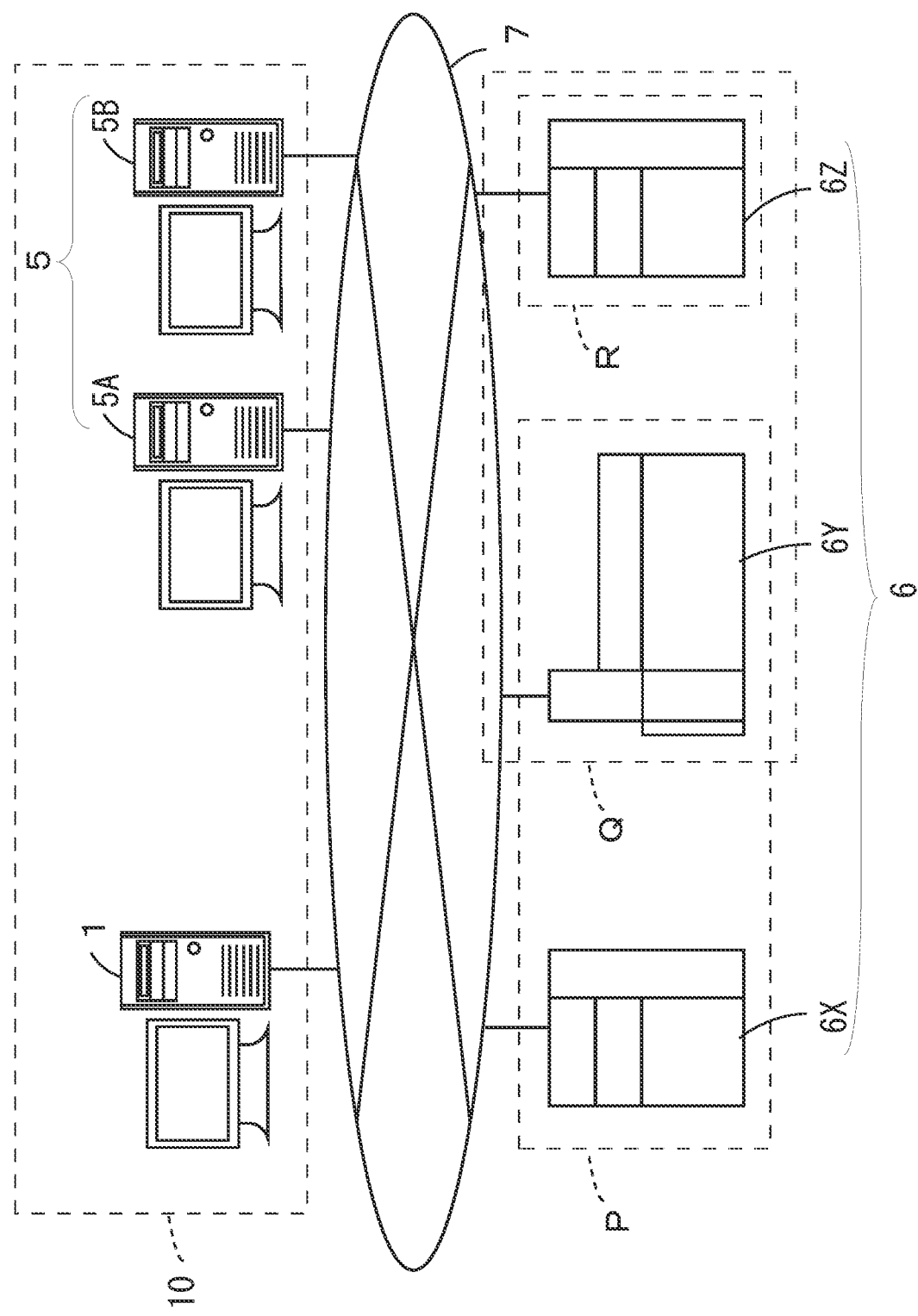
FIG. 1 is an overview of an analysis system including an analysis device management system according to the present embodiment.

FIG. 1 is an overview of an analysis system including the analysis device management system 10 according to the present embodiment. The analysis system includes a management device 1, terminals 5A, 5B and analysis devices 6X, 6Y, 6Z. The management device 1, the terminals 5A, 5B and the analysis devices 6X, 6Y, 6Z are connected to a network 7. The management device 1 and the terminals 5A, 5B constitute the analysis device management system 10. Hereinafter, the terminals 5A, 5B are collectively and suitably referred to as a terminal 5. Also, the analysis devices 6X, 6Y, 6Z are collectively referred to as an analysis device 6.

PCs (personal computers) are utilized as the management device 1 and the terminals 5A, 5B, for example. The analysis devices 6X to 6Z are a liquid chromatograph, a gas chromatograph and a mass spectrometer, for example. The network 7 is a LAN (Local Area Network), for example.

The management device 1 has a role as a server in the analysis device management system 10. A user can access the management device 1 via the network 7 and utilize various functions of the analysis device management system 10 by operating the terminal 5. Alternatively, the user can utilize various functions of the analysis device management system 10 by directly operating the management device 1.

The analysis device management system 10 manages the analysis device 6 as a virtual device on the system. In the example shown in FIG. 1, the combination of the analysis device 6X and the analysis device 6Y is managed as a device P which is a virtual device. The combination of the analysis device 6Y and the analysis device 6Z is managed as a device Q which is a virtual device. The analysis device 6Z is managed as a device R which is a virtual device and a single analysis device.

(2) Configuration of Management Device

Figure 2:
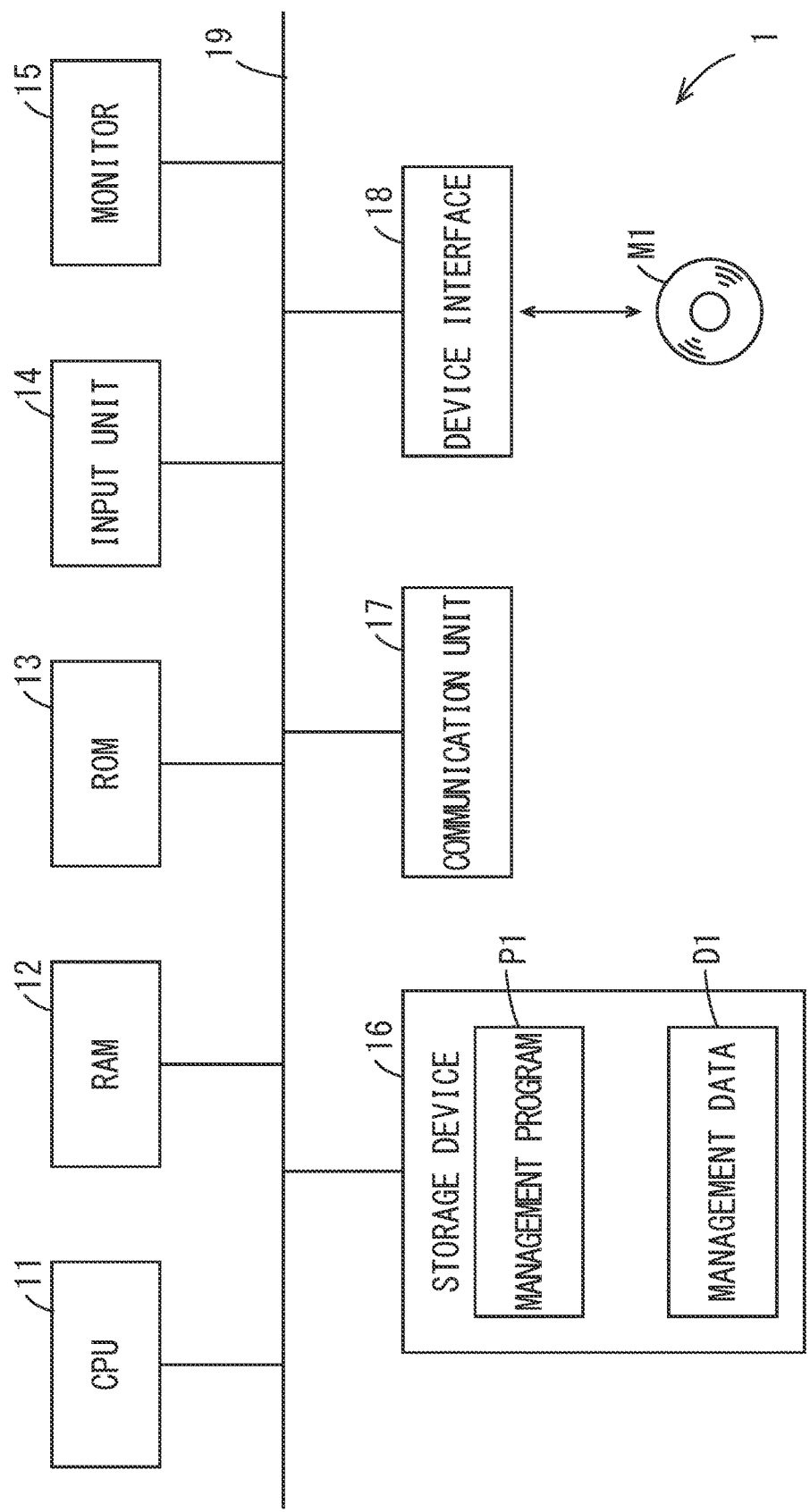
FIG. 2 is a diagram showing the configuration of a management device according to the present embodiment.

The configuration of the management device 1 will be described next with reference to FIG. 2. FIG. 2 is a diagram showing the configuration of the management device 1 according to the present embodiment. The management device 1 includes a CPU (Central Processing Unit) 11, a RAM (Random Access Memory) 12, a ROM (Read Only Memory) 13, an input unit 14, a monitor 15, a storage device 16, a communication unit 17 and a device interface 18. The CPU 11, the RAM 12, the ROM 13, the input unit 14, the monitor 15, the storage device 16, the communication unit 17 and the device interface 18 are connected to a bus 19.

The input unit 14 includes an input device such as a keyboard or a mouse. The storage device 16 is a storage medium such as a hard disc. A management program P1 and management data D1 are stored in the storage device 16. The CPU 11 performs an analysis device management method of the present embodiment by executing the management program P1 while using the RAM 12 as a work area.

The communication unit 17 transmits and receives data via the network 7. The management device 1 utilizes the communication unit 17 to execute a process of communicating with the terminal 5. The device interface 18 is an interface with an external device. The CPU 11 can access a storage medium M1 via the device interface 18. The storage medium M1 is a CD-ROM, a DVD-ROM or a DVD-RAM, for example.

(3) Functional Configuration of Management Device

Figure 3:
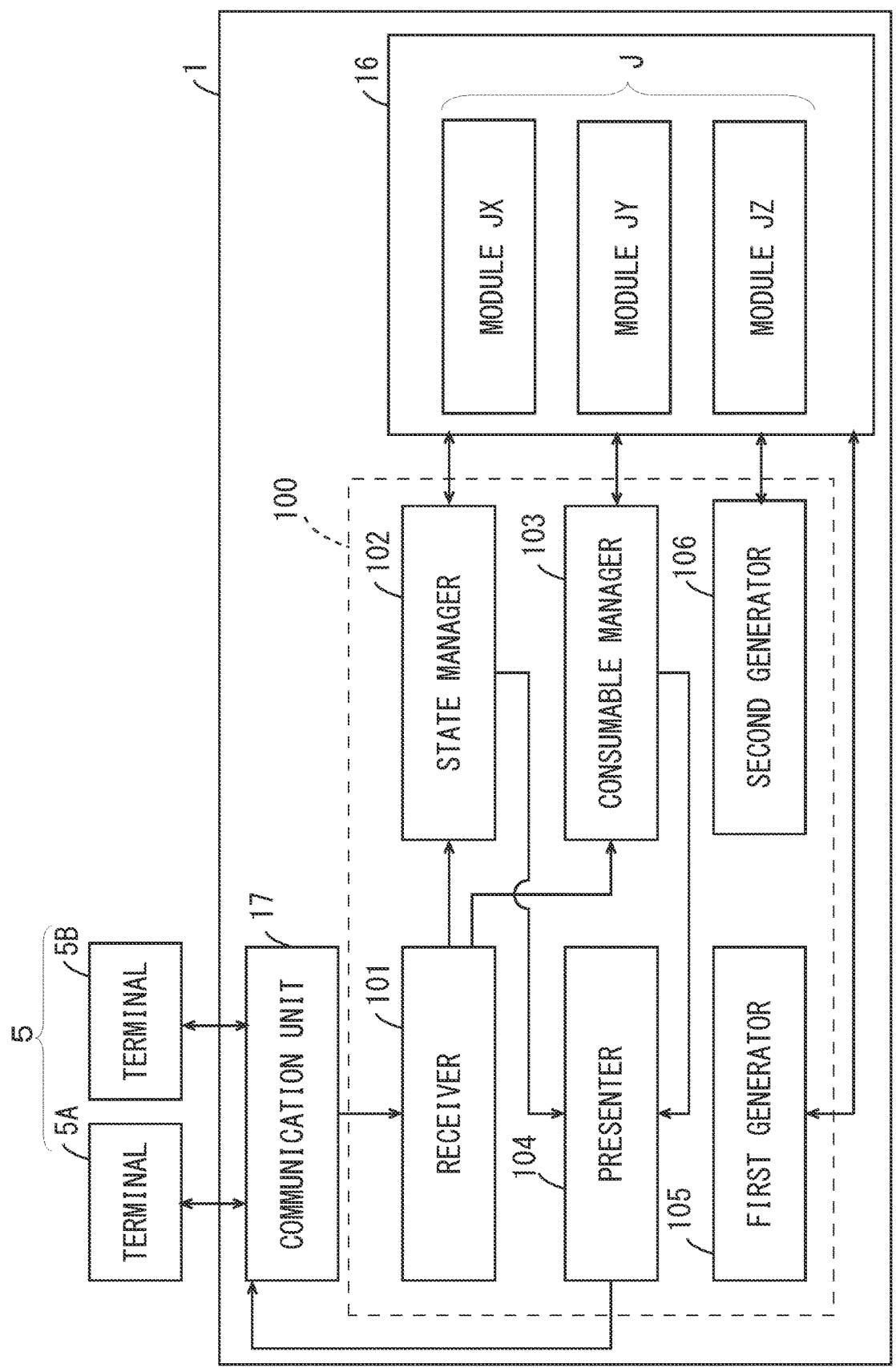
FIG. 3 is a block diagram showing the functions of the management device according to the present embodiment.

The functional configuration of the management device 1 will be described next. FIG. 3 is a block diagram showing the functions of the management device 1 according to the present embodiment. As shown in FIG. 3, the management device 1 includes a controller 100. The controller 100 is a function implemented when the CPU 11 shown in FIG. 2 executes the management program P1 while utilizing the RAM 12 as a work area. The controller 100 includes a receiver 101, a state manager 102, a consumable manager 103, a presenter 104, a first generator 105 and a second generator 106.

Modules JX, JY, JZ are stored in the storage device 16. The modules JX, JY, JZ are the data structures generated to one-to-one correspond to the analysis devices 6X, 6Y, 6Z. The modules JX, JY, JZ are the data structures generated by execution of the management program P1 with reference to the management data D1. Hereinafter, the modules JX, JY, JZ are collectively and suitably referred to as a module J. The module J includes state information and usage information in regard to the analysis device 6. As the state information of the analysis device 6, the statuses of the analysis device 6 such as 'Ready for analysis,' 'Analysis in progress,' 'In preparation' and 'Error' are set in the module J. As the usage information of the analysis device 6, information such as the usage count of all consumables included in the analysis device 6 or a remaining number of times the analysis device 6 can execute an analysis process, etc. are set in the module J. In addition, statistical information such as a usage rate or a failure rate of the analysis device 6 is set in the module J. The information set in the module J is recorded in the management data D1.

The receiver 101 receives an analysis execution request transmitted from the terminal 5 via the communication unit 17. The state manager 102 refers to the state information set in the module J and executes a process of updating the state information based on the analysis execution request received by the receiver 101. The consumable manager 103 refers to the usage information set in the module J and executes a process of updating the usage information based on the analysis execution request received by the receiver 101. The presenter 104 presents a message in a case where the analysis execution request received by the receiver is non-executable.

The first generator 105 generates the module J. The first generator 105 generates the modules JX, JY, JZ corresponding to the analysis devices 6X, 6Y, 6Z. That is, the first generator 105 generates the module J that one-to-one corresponds the analysis device 6. The second generator 106 generates a virtual device constituted by the one or plurality of modules J. Specifically, a virtual device is the information representing the setting in regard to a combination of one or a plurality of modules. The setting information in regard to the module J and the virtual device is stored in the storage device 16.

(4) Analysis Device Management Method

Figure 4:
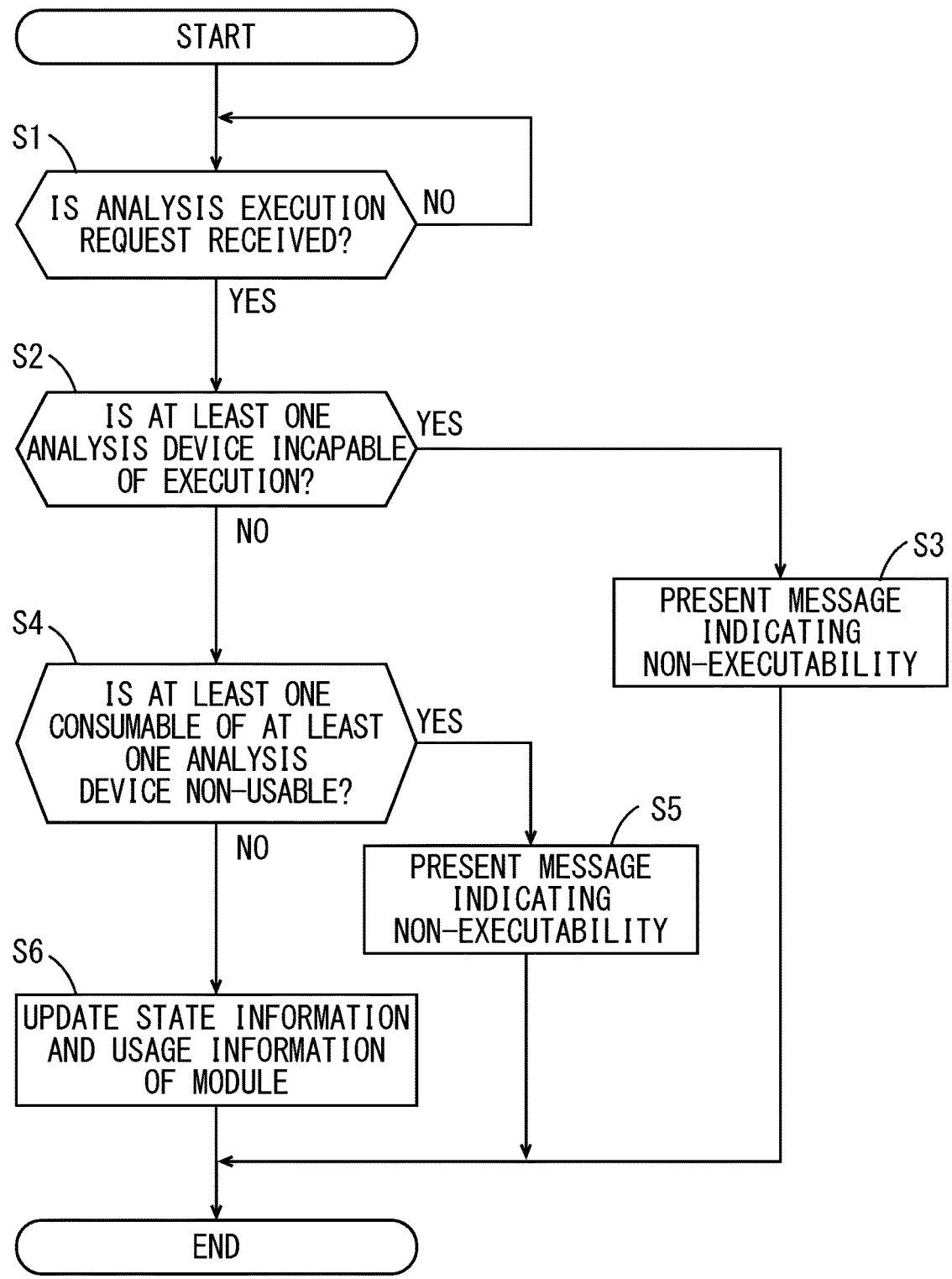
FIG. 4 is a flowchart showing a method of managing the analysis device according to the present embodiment.

The analysis device management method according to the present embodiment will be described next with reference to FIG. 4. FIG. 4 is a flowchart showing the analysis device management method. The analysis device management method shown in FIG. 4 is performed by execution of the management program P1 by the CPU 11.

In the step S1, the receiver 101 determines whether an analysis execution request has been received from the terminal 5 via the communication unit 17. Although the two terminals 5A, 5B are shown in FIG. 1 in this embodiment, the number of terminals 5 that access the management device 1 is not limited in particular. An analysis execution request may be received from another terminal 5 connected to the network 7. Alternatively, in a case where the user is operating the management device 1, the receiver 101 may receive an analysis execution request from the input unit 14.

Figure 5:
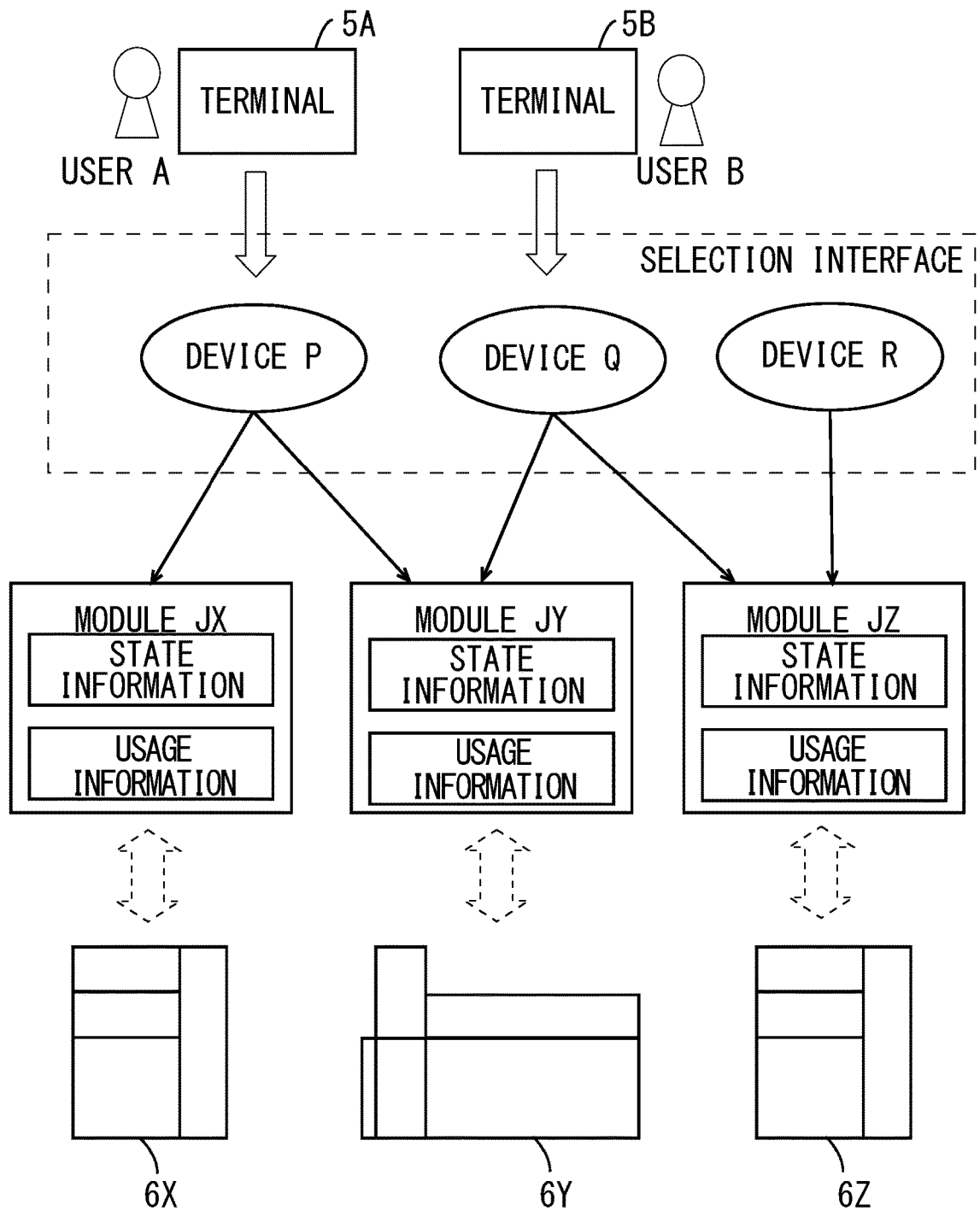
FIG. 5 is a diagram showing the relationship between a virtual device designated by an analysis execution request and a module.

FIG. 5 is a diagram showing the relationship between a virtual device designated by an analysis execution request and the module J. When being accessed by the terminal 5 via the network 7, the receiver 101 supplies a selection interface for a virtual device to the terminal 5. In FIG. 5, a selection interface for the three devices P, Q, R is shown as a virtual device. The device P is a virtual device which is a combination of the analysis device 6X and the analysis device 6Y. The device Q is a virtual device which is a combination of the analysis device 6Y and the analysis device 6Z. The device R is a virtual device corresponding to the single analysis device 6Z.

Although not shown in FIG. 5, as for the devices P, Q, information about the plurality of analysis devices 6 is displayed in the selection interface. For example, in regard to the device P, the contents of an executable analysis process by the combination of the analysis device 6X, 6Y, etc. are shown. Thus, the user can find a virtual device that can execute a desired analysis process requiring the plurality of analysis devices 6. In FIG. 5, a user A operates the terminal 5A to make an analysis execution request for the device P, by way of example. Further, a user B operates the terminal 5B to make an analysis execution request for the device Q, by way of example.

In the step S1 of FIG. 4, in a case where the receiver 101 receives an analysis execution request from the terminal 5, the process proceeds to the step S2. In the step S2, the state manager 102 determines whether at least one analysis device 6 that constitutes a virtual device selected by the analysis execution request is incapable of execution. The state manager 102 accesses the module J corresponding to all of the analysis devices 6 that constitute the virtual device selected by the analysis execution request. In a case where a status indicating non-executablity of an analysis process is set as the state information in at least one referred module J, the state manager 102 determines that the analysis execution request is non-executable. For example, in a case where a status such as 'Analysis in progress,' 'In preparation,' 'Error' or the like is set in the module J, it is determined that a corresponding analysis device 6 is incapable of executing the analysis process.

The step S2 will be described with reference to the example of FIG. 5. In a case where the user A operates the terminal 5A to make the analysis execution request for the device P, the state manager 102 determines whether one of the analysis device 6X, 6Y that constitute the device P selected by the analysis execution request is incapable of execution. That is, when the state manager 102 refers to the module JX or JY, in a case where a status indicating non-executability of the analysis process is set as the state information of any module J, the state manager 102 determines that the analysis execution request is non-executable.

In the step S2 of FIG. 4, in a case where it is determined that at least one analysis device 6 is non-executable, the presenter 104 presents a message indicating non-executability to the terminal 5 in the step S3. The presenter 104 transmits the message indicating non-executability to the terminal 5 via the communication unit 17. The terminal 5 displays a message indicating non-executability of the analysis execution request in a monitor included in the terminal 5. In a case where a user who operates the management device 1 has made the analysis execution request, the message indicating non-executability may be displayed on the monitor 15 of the management device 1.

In the step S2 of FIG. 4, in a case where it is not determined that at least one analysis device 6 is incapable of execution, that is, in a case where it is determined that all of the analysis devices 6 required for execution of an analysis is capable of execution, the process proceeds to the step S4. In the step S4, the consumable manager 103 determines whether at least one of the consumables of at least one analysis device 6 that constitutes the virtual device designated by the analysis execution request is non-usable. The consumable manager 103 accesses the module J corresponding to all of the analysis devices 6 that constitute the virtual device designated by the analysis execution request. In a case where the information representing non-usability of consumables is set as the usage information in at least one referred module, the consumable manager 103 determines that the analysis execution request is non-executable.

The step S4 will be described with reference to the example of FIG. 5. In a case where the user A has operated the terminal 5A to make the analysis execution request, the consumable manager 103 determines whether at least one of the consumables of the analysis device 6X or at least one of the consumables of the analysis device 6Y is non-usable, the analysis device 6X and the analysis device 6Y constituting the device P designated by the analysis execution request. When the consumable manager 103 refers to the module JX or JY, in a case where the information representing non-usability of consumables is set as the usage information in any module J, the state manager 102 determines that the analysis execution request is non-executable.

In the step S4, in a case where it is determined that at least one of the consumables of at least one analysis device 6 is non-usable, the presenter 104 presents a message indicating non-executability to the terminal 5 in the step S5. The presenter 104 transmits the message indicating non-executability to the terminal 5 via the communication unit 17. The terminal 5 displays a message indicating non-executability of the analysis execution request in a monitor included in the terminal 5. In a case where the user who operates the management device 1 has made the analysis execution request, the message indicating non-executability may be displayed on the monitor 15 of the management device 1.

In the step S4, in a case where it is not determined that at least one of the consumables of at least one analysis device 6 is non-usable, that is, in a case where it is determined that all of the consumables of all of the analysis devices 6 required for execution of an analysis are usable, the process proceeds to the step S6. In the step S6, the state manager 102 updates the state information of the module J. Specifically, the state manager 102 changes the statuses of all of the analysis device 6 to be activated by the analysis execution request to 'Analysis in progress.' Further, in the step S6, the consumable manager 103 updates the usage information of the module J. Specifically, the consumable manager 103 increases the usage count of all of the consumables of all of the analysis device activated by the analysis execution request by an analysis count.

The step S6 will be described with reference to the example of FIG. 5. In a case where the user A has made the analysis execution request for the device P, the state manager 102 updates the state information of the modules JX, JY and changes the statuses set in regard to the modules JX, JY to 'Analysis in progress.' Further, in the step S6, the consumable manager 103 updates the usage information of the modules JX, JY and increases the usage count of all of the consumables set in the modules JX, JT by an analysis count. In a case where the user B has operated the terminal 5B to make the analysis execution request for the device Q after the statuses of the modules JX, JY are changed to 'Analysis in progress,' since the state of the module JY is 'Analysis in progress,' a message indicating non-executability of the analysis process is displayed in the step S3 of FIG. 4. Thus, the user B can be quickly informed that the analysis process according to the analysis execution request is non-executable.

As described above, the analysis device management system 10 according to the present embodiment generates the module J that one-to-one corresponds to the analysis device 6 and manages the analysis device 6 using the module J. When receiving an analysis execution request for using the plurality of analysis devices 6 from the user, the analysis device management system 10 can present whether an analysis process is executable to the user by referring to the module J. Further, because the consumables of the analysis device 6 are managed by the module J that is generated to one-to-one correspond to the analysis device 6, the usage count of the consumables of the analysis device 6 can be identified accurately. Thus, because the remaining usage count of the consumables of the analysis device 6 can be identified accurately, it is possible to present whether an analysis process is executable to the user by referring to the module J.

Further, because the analysis device management system 10 according to the present embodiment manages a virtual device constituted by the plurality of analysis devices 6, also in a case where an analysis device 6 shared by a plurality of virtual devices is present, it is possible to identify the states of individual analysis devices 6 and the usage conditions of the consumables from each virtual device. Even when one virtual device is using a shared analysis device, another virtual device can identify the state of the shared analysis device and usage conditions of consumables.

(5) Other Embodiments

In the above-mentioned embodiment, the two analysis devices 6X, 6Y are managed as the device P, and the two analysis devices 6Y, 6Z are managed as the device Q, by way of example. In another embodiment, three or more than three analysis devices may be managed as one virtual device. For example, in a case where three analysis devices are managed as one virtual device, the analysis device management system 10 may refer to three modules J and execute a process of updating the three modules.

In the above-mentioned embodiment, the analysis device management system 10 manages the analysis device 6 by referring to the module J stored in the storage device 16 of the management device 1. Thus, it is not necessary for the management device 1 to directly acquire information from the analysis device 6 or directly control the analysis device 6. In another embodiment, the management device 1 may have a function of acquiring information of the analysis device 6 or a function of controlling the analysis device 6 via the network 7.

In the above-mentioned embodiment, the management program P1 is saved in the storage device 16, by way of example. In another embodiment, the management program P1 may be provided in the form of being saved in the storage medium M1. The CPU 11 of the management device 1 may access the storage medium M1 via the device interface 18 and may save the management program P1, saved in the storage medium M1, in the storage device 16 or the ROM 13. Alternatively, the CPU 11 may access the storage medium M1 via the device interface 18 and execute the management program P1 saved in the storage medium M1. Further alternatively, the CPU 11 may download the management program P1 via the network 7 and save the management program P1 in the storage device 16 or the ROM 13. In a case where the communication unit 17 is connected to the Internet, the management program P1 may be downloaded from a server on the Internet.

(6) Aspects

It is understood by those skilled in the art that the plurality of above-mentioned illustrative embodiments are specific examples of the below-mentioned aspects.

(Item 1) An analysis device management system according to one aspect of the present invention that manages one or a plurality of analysis devices includes a first generator that generates a module that one-to-one corresponds to each analysis device and manages state information of a corresponding analysis device, a storage that stores the module, a receiver that receives an analysis execution request for using the one or plurality of analysis devices, and a state manager that updates the state information of one or a plurality of modules corresponding to the one or plurality of analysis devices designated by the received analysis execution request.

In a system that can execute an analysis process using a plurality of analysis devices, a system that can identify the states of the individual analysis devices can be provided.

(Item 2) The analysis device management system according to item 1 may further include a second generator that generates a virtual device constituted by the one or plurality of modules, wherein the storage may store the virtual device.

One or a plurality of analysis devices can be managed in the storage device as one virtual device.

(Item 3) The analysis device management system according to item 2, wherein the receiver may receive the analysis execution request that selects the virtual device.

A user can make a request for executing an analysis process that requires a plurality of analysis devices by selecting a virtual device.

(Item 4) The analysis device management system according to any one of items 1 to 3, wherein the module may manage usage information of consumables included in each analysis device, and the analysis device management device may further include a consumable manager that updates usage information of the one or plurality of modules corresponding to the one or plurality of analysis devices designated by the received analysis execution request.

In a system that can execute an analysis process requiring a plurality of analysis devices, also in a case where there is an analysis device shared with a plurality of virtual devices, a system that can identify the states of the individual analysis devices and the usage conditions of consumables from the respective virtual devices can be provided.

(Item 5) The analysis device management system according to any one of items 1 to 4 may further include a presenter that presents a message indicating non-executability in a case where the state manger determines that at least one analysis device is incapable of execution by referring to the state information of the one or plurality of modules.

A user can quickly identify whether an analysis process according to an analysis execution request is executable.

(Item 6) The analysis device management system according to item 4 may further include a presenter that presents a message indicating non-executability in a case where the consumable manager determines that at least one of the consumables of at least one analysis device is non-usable by referring to the usage information of the one or plurality of modules.

A user can quickly identify whether an analysis process according to an analysis execution request is executable.

(Item 7) A non-transitory computer readable medium storing an analysis device management program according to another aspect of the present invention that manages one or a plurality of analysis devices, causes a computer to execute the processes of generating a module that one-to-one corresponds to each analysis device and manages state information of a corresponding analysis device, receiving an analysis execution request for using the one or plurality of analysis devices, and updating the state information of one or a plurality of modules corresponding to the one or plurality of analysis devices designated by the received analysis execution request.

A system that can identify the states of individual analysis devices while being capable of determining executability of an analysis process that requires a plurality of analysis devices can be provided.

(Item 8) A non-transitory computer-readable medium storing the analysis device management program according to item 7 may cause a computer to further execute a process of generating a virtual device constituted by the one or plurality of modules.

One or a plurality of analysis devices can be managed in a computer as one virtual device.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. An analysis device management system configured to manage one or more analysis devices, the analysis device management system comprising:
    a first generator configured to generate a data structure having a one-to-one correspondence to each analysis device of the one or more analysis devices and to manage a state information of a corresponding analysis device of the one or more analysis devices;
    a storage device configured to store the data structure generated by the first generator;
    a receiver configured to receive a first analysis execution request designating the corresponding analysis device of the one or more analysis devices and for using the one or more analysis devices; and
    a state manager configured to update the state information of the corresponding analysis device of the one or more analysis devices designated by the received analysis execution request.

2. The analysis device management system according to claim 1, further comprising a second generator configured to generate a virtual device comprising one or more data structures, wherein the storage device is configured to store the virtual device generated by the second generator.

3. The analysis device management system according to claim 2, wherein the receiver is further configured to receive a second analysis execution request selecting the virtual device generated by the second generator.

4. The analysis device management system according to claim 1, wherein the data structure can be used to manage usage information of consumables included in each analysis device of the one or more analysis devices, and the analysis device management device further includes a consumable manager configured to update a usage information of the one or more data structures corresponding to the one or more analysis devices designated by the received first analysis execution request.

5. The analysis device management system according to claim 1, wherein the state manager is further configured to determine whether at least one analysis device of the one or more analysis device is incapable of an execution based on the state information of the one or more analysis device and wherein the analysis device management system further includes a presenter configured to present a message indicative of a non-executability when the state manager determines at least one analysis device of the one or more analysis devices is incapable of the execution based on the state information of the one or more data structures.

6. The analysis device management system according to claim 4, wherein the consumable manager is configured to determine whether at least one consumable of the one or more analysis devices is non-usable based on the usage information of the one or more data structures, the analysis device management system further comprising a presenter configured to present a message indicative of a non-executability when the consumable manager determines at least one consumable of the consumables of at least one analysis device is non-usable based on the usage information of the one or more data structures.

7. A non-transitory computer readable medium storing instructions comprising an analysis device management program that, when executed by the analysis device management system of claim 1 causes the analysis device management system to:
    generate a data structure having a one-to-one correspondence to each analysis device of the one or more analysis devices and to manage state information of a corresponding analysis device of the one or more analysis devices;
    receive an analysis execution request designating the one or more analysis devices for using the one or more analysis devices; and
    update a state information of one or more data structures corresponding to the one or more analysis devices designated by the received analysis execution request.

8. The non-transitory computer-readable medium of claim 7 storing further instructions for the analysis device management program that, when executed by the analysis device management system, causes the analysis device management system to generate a virtual device based on the one or more data structures.

* * * * *